July 16, 1940.  H. BRANDT  2,207,850
GYROSCOPIC DEVICE
Filed Nov. 24, 1937  4 Sheets-Sheet 1

Inventor
Hermann Brandt
By Stephen Cerstvik
Attorney

July 16, 1940.   H. BRANDT   2,207,850
GYROSCOPIC DEVICE
Filed Nov. 24, 1937    4 Sheets-Sheet 2
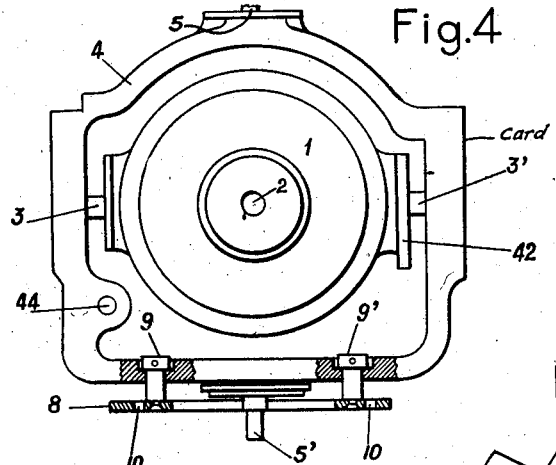
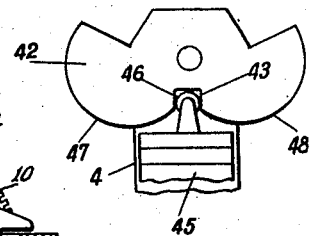
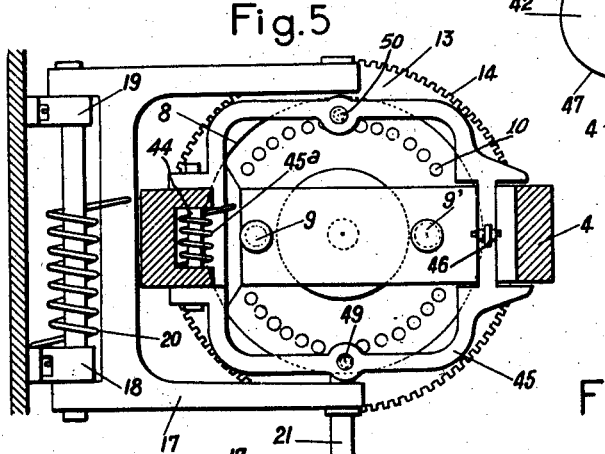
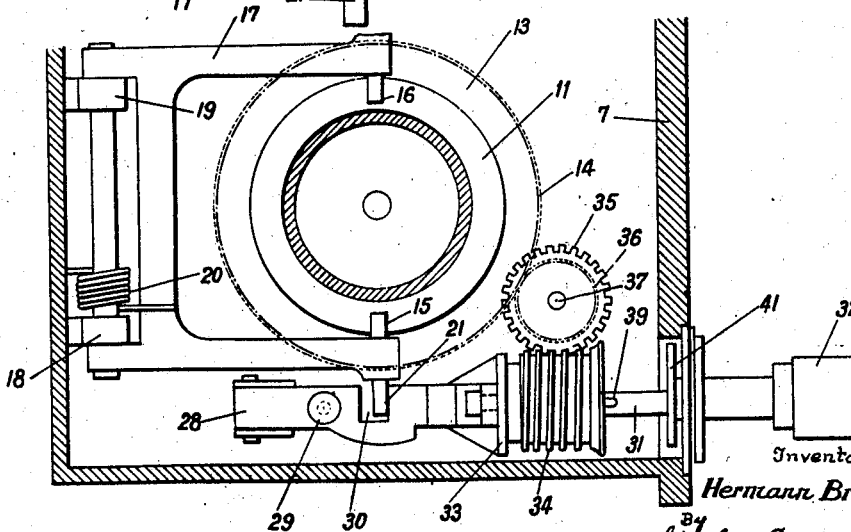
Inventor
Hermann Brandt
By Stephen Cerstvik
Attorney July 16, 1940.  H. BRANDT  2,207,850
GYROSCOPIC DEVICE
Filed Nov. 24, 1937  4 Sheets-Sheet 3
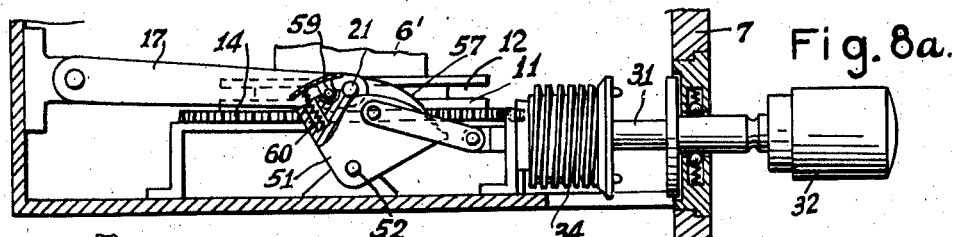
Fig. 8a.
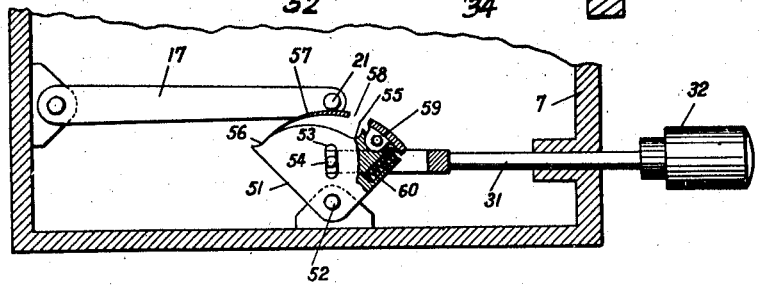
Fig. 8.
Fig. 9
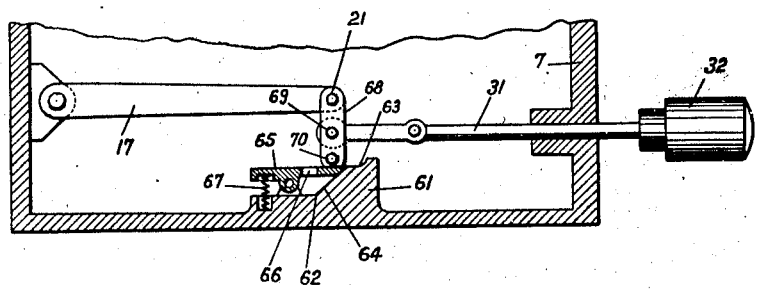
Fig. 10
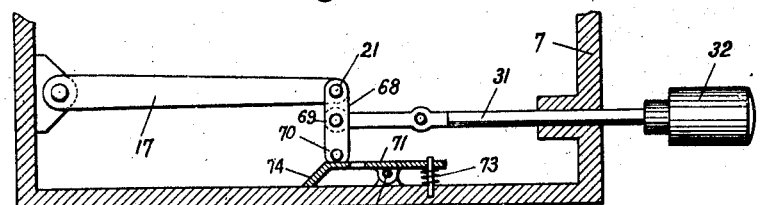
Fig. 13.
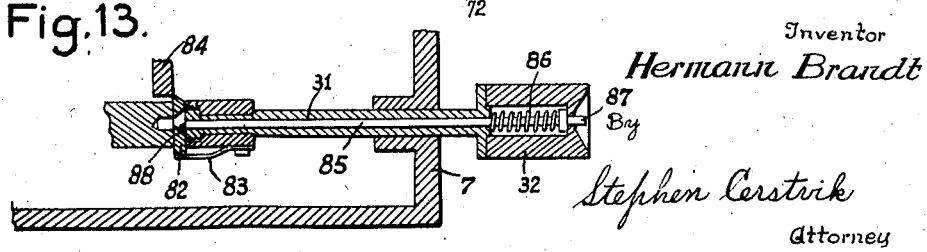
Inventor
Hermann Brandt
By
Stephen Cerstvik
Attorney July 16, 1940.  H. BRANDT  2,207,850
GYROSCOPIC DEVICE
Filed Nov. 24, 1937   4 Sheets-Sheet 4
Fig.11
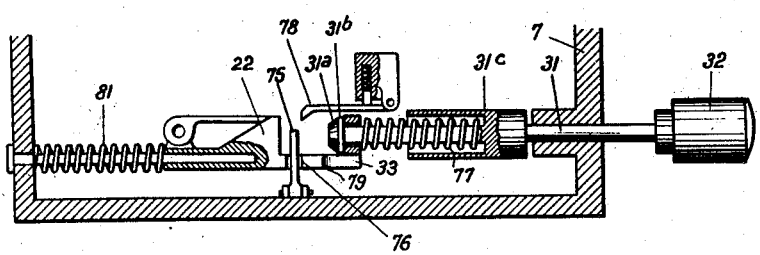
Fig.12
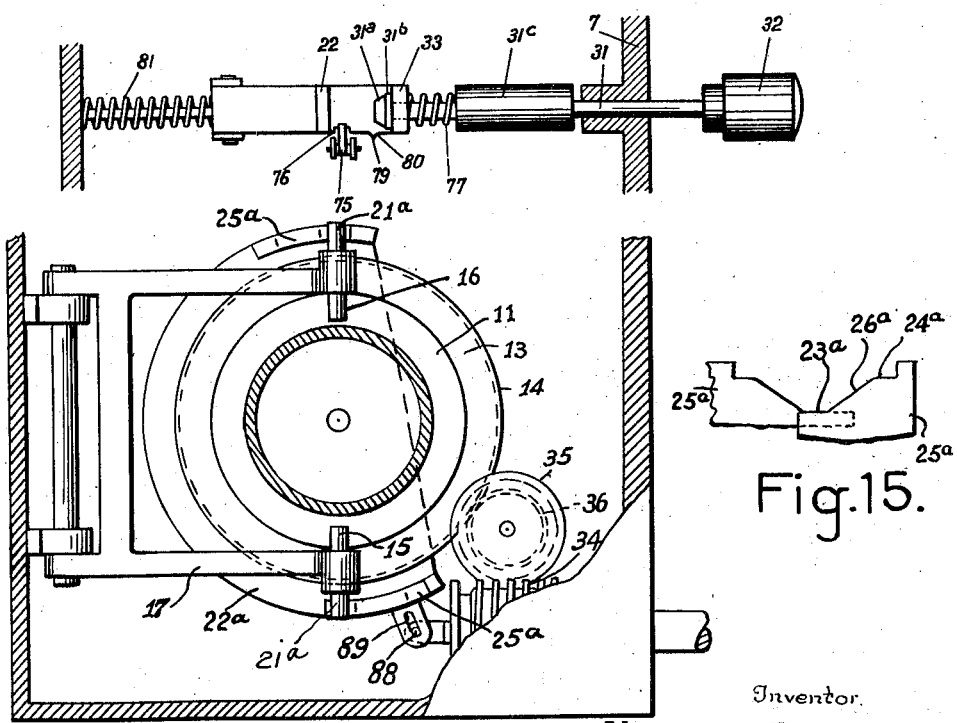
Fig.14.
Fig.15.
Inventor.
Hermann Brandt
By
Stephen Cerstvik
Attorney Patented July 16, 1940

2,207,850

UNITED STATES PATENT OFFICE 2,207,850

GYROSCOPIC DEVICE

Hermann Brandt, Berlin, Germany, assignor to Siemens Apparate und Maschinen Gesellschaft mit beschrankter Haftung, Berlin, Germany, a corporation of Germany Application November 24, 1937, Serial No. 176,347
In Germany November 25, 1936

7 Claims. (Cl. 74—5)

The present invention relates to instruments and more particularly to instruments of the gyroscopic type.

One object of the present invention is to provide a gyroscopic instrument adapted to be used as a directional gyroscope with a device for fixing the axis of the card and a second device which becomes effective each time after the first mentioned device for fixing the trimming or setting up axis.

A further object of the invention is to provide a device of this kind which is inexpensive to manufacture while insuring a reliable operation. This result is obtained among others by the fixing device for the card axis containing a coupling device, which is preferably formed of two pieces, one of which is connected to the card axis and longitudinally slidably mounted on the same, while the other piece is longitudinally slidably and rotatably mounted on said card axis.

Other features of the invention will result from the following description of an embodiment given by way of example and shown in the drawings.

Fig. 4 is a side view with one coupling member;

Fig. 5 is a plan view with the gyroscope omitted;

Fig. 6 is a sectional plan view through the line VI—VI of Fig. 1, with a part omitted;

Fig. 7 is a view of the curve body;

Figs. 8, 8a, 9 and 10 are examples of execution of the switching device;

Figs. 11 and 12 are an example of execution of the switching device with a force storing device;

Figure 13 is a sectional view through the push rod with the security device; and Figs. 14 and 15 illustrate another modification of applicant's device.

Figure 1:
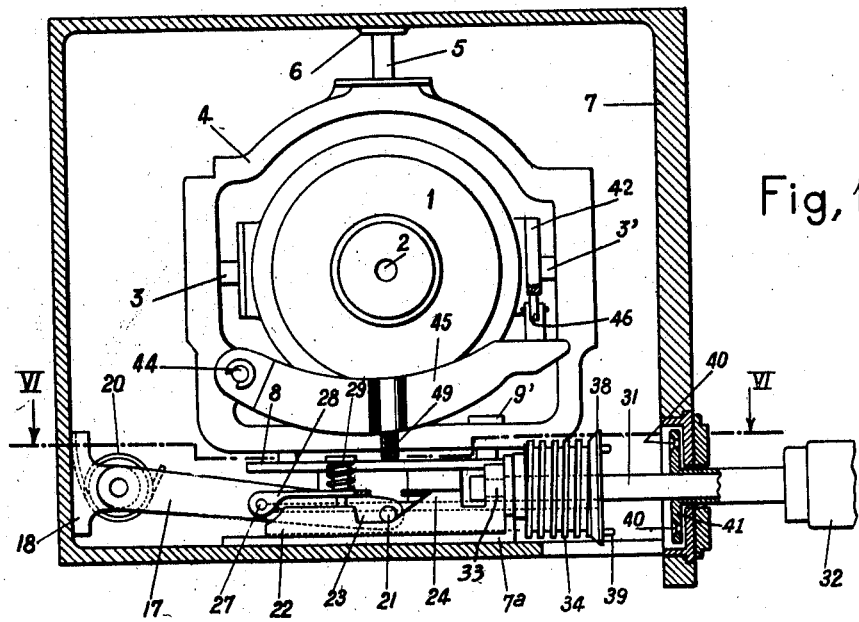
Fig. 1 is a side view of the instrument, including the actuating worm gear.

In the example of execution, a gyroscopic instrument is shown which is adapted to be used as a directional gyroscope. The gyroscope, which is mounted in the casing 1, comprises a horizontal rotation axis 2. The gyroscope casing 1 is rotably mounted in the universal joint frame 4, carrying the gyro card with a horizontal axis 3, 3'. The universal joint frame is rotatably mounted about the vertical card axis 5, 5', see Figs. 1 and 4, and supported in suitable bearings 6, 6' see Figs. 1 and 3 fast with the casing 7.

The fixing device for the card axis 5, 5' contains a coupling device formed of two pieces in the form of a disc coupling coaxial with the axis of the card. One member of the coupling device is formed of the disc 8 see Fig. 4 which is of an annular circular form and so connected with the universal joint frame 4 that it can slide in the direction of the axis of the card, but so that it can rotate only together with the frame 4 about the axis 5, 5' of the card. This connection with the frame 4 is effected, as may be seen more particularly from Fig. 4, by means of two bolts, 9, 9' inserted in the disc 8 and longitudinally slidably mounted in corresponding bores of the frame 4 and representing a driving clutch between the disc 8 and the frame 4. As shown in Fig. 5, the the disc 8 is provided with a series of small bores 10, the purpose of which will be explained later.

Figure 3:
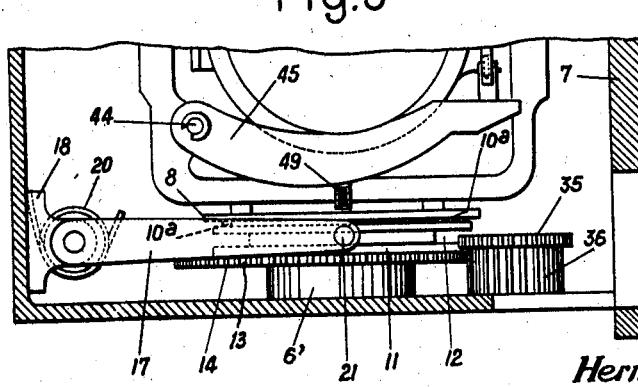
Fig. 3 is a view of the coupling device formed as in Fig. 1 with certain parts omitted illustrating two pieces with the setting gear.

In alignment with the axis 5, 5' of the card on the bearing support 6' for this axis, is mounted the second member of the said coupling device, the arrangement being such that this member is longitudinally slidably and simultaneously rotatably mounted on the bearing support 6' which is fast with the casing. This coupling member comprises a body in the form of a disc 11 see Fig. 3 provided with a circular groove in the form of a channel 12. This body 11 is integral with or connected to an annular circular flange 13 see Figs. 3 and 5 the diameter of which is larger than that of the member 11. On its periphery, flange 13 is provided with a toothed crown wheel 14.

Into the groove 12 project two pins 15 and 16 respectively, as shown in Figure 6. The said pins are diametrically mounted opposite one another and each of them is firmly secured to an arm of a forked lever 17 which, on its side, is mounted in bearings 18, 19 fast with the casing and so that it can rock in the direction of the axis 5, 5' of the card. Adjoined to the forked lever 17 is a return spring 20 opposing the raising movement of the lever and thus constantly urging the said lever downwardly.

On the other side of its supporting arm, the pin 15 is extended in the form of a member 21 acting as a pitman. The pitman 21 is in operative relation with a member 22 see Figs. 1 and 2 acting as a switching member, the movement of which is effected in a direction lying in a plane which is perpendicular to the pitman 21 and also substantially perpendicular to the direction of the movement of the pitman. The switching member 22, which as shown in an elevational view in Figs. 1 and 2, comprises two excellent supporting surfaces for the pitman 21, that is, a rest surface 23 for the position of rest and a surface 24 serving as an operative seat. Between both seats 23 and 24 is a cam-shaped part 25 of the switching member which comprises a running path 26 for the pitman 21. In the example of execution, this running path is in a sloping plane so that the pitman has a uniform velocity with respect to the movement of the switching member. It is obvious, however, that the running path may have the form of any curve according to the relative velocity which is desired between the switching member 22 and the coupling member which is actuated by the same. Thus, it would be directly possible, for instance, with respect to the switching operation, which is effected in two switching steps, so to arrange the same in its period of time that the first switching step, which causes the fixing of the axis of the card, is effected comparatively more rapidly than the second switching step in which the fixing of the setting up axis is effected. For this purpose, it is sufficient to form the cam-shaped part of the switching member in a manner which corresponds to the curve which it is desired for the raising of the pitman 21.

Figure 2:
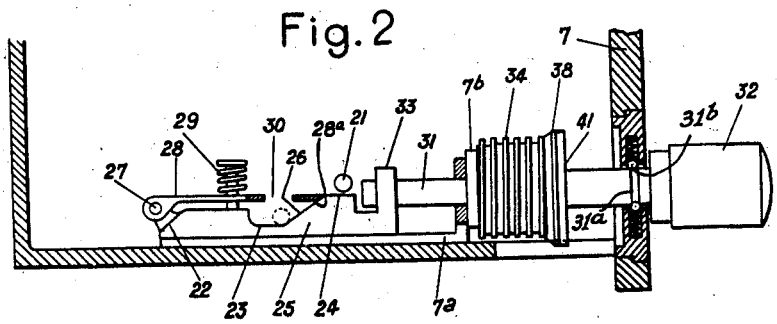
Fig. 2 is a view of the switching device in the operative position.

To the switching member 22 is pivotally connected at 27 a cut out member 28 see Fig. 6 which a spring 29 see Fig. 2 urges towards the switching member 22. With its free end, this member 28 rests at the edge 28a on the upper end of the running path 26 of the pitman 21 said edge 28a being bevelled so as to correspond to the running path, so that the upper face of 28 is in a plane with the operative supporting surface 24, the bevelled form of the edge permitting of a jointless transition between the surface 24 and the upper face of the member 28. Vertically above the resting surface 23 for the pitman the member 28 is provided with a cut out portion forming a recess 30 see Fig. 6 which is so designed that the pitman can conveniently pass through the same, as will be explained below.

The switching member 22 is mounted so as to be longitudinally slidable on a guiding bar 7a, see Figs. 1 and 2 fast with the casing, which, of course, can also form a part of the casing. The said member 22 is coupled with a pushing rod 31 in the form of a member for hand actuation, which is longitudinally slidably and rotatably mounted in the casing 7. At one end the pushing rod is provided with an actuating button 32, while it is connected at its other end with the flange 33 of the switching member and rotatably mounted in this flange. For this purpose, the pushing rod can be provided with a groove in the form of a trunnion provided with collars. Coaxial with the pushing rod 31 is mounted the worm 34 of a worm gear. This worm 34 is fast with the casing and mounted, for instance, on the flange 7b of the guiding bar 7a. It is rotatably mounted on the said axis so that a relative longitudinal sliding relation exists between said worm and the push rod 31. The worm 34 engages a worm wheel 35 whose axis of rotation is also fast with the casing, as may be seen more particularly from Figures 3 and 6. The worm wheel 35 is integral with a pinion 36 and mounted on a common axis of rotation 37 see Fig. 6 with said pinion. The pinion engages the toothed crown wheel 14 which has already been mentioned above. The pinion 36 and the crown wheel 14 form the setting gear actuated by the worm gear 34 and wheel 35 for the azimuthal setting of the axis 5, 5' of the card. Said pinion and crown wheel are preferably provided with straight teeth since these permit longitudinal relative sliding movement of gears 36 and 14. The worm 34 is provided with a flange 38 which contains one or more pins 39, see Fig. 1. To these pins correspond bores 40 which are provided in a disc or plate 41 secured on the axis 31 of the push rod.

The fixing device for the setting up axis 3, 3' comprises a cam 42 see Fig. 4 secured on the part 3' of the axis and which can have the form shown in Figure 7. This cam is provided with a recess 43 serving as a rest. With the cam cooperates a bail 45 see Figs. 1 and 5 pivotally mounted at 44 on the universal joint frame 4 and constantly downwardly urged by a return spring 45a. The bail 45 engages the cam 42 through the medium of a roller 46 secured to the said bail. When the cam is in the neutral position shown in Fig. 7, the roller 46 directly enters the rest 43 in the manner shown in Fig. 7, upon a rocking movement of the bail 45, whereby the setting up axis 3, 3' is directly fixed. However, if the setting up axis has rocked out of its normal position, that is to say with respect to the universal joint frame 4, the roller 46 first engages one or the other of the two front edges 47, 48 of the cam 42, which edges are curved and begin on the recess 43. When the roller 46 passes on the corresponding front edge and owing to a convenient choice of the form of the curve of the front edges, the cam and with it the axis 3, 3', which is connected to the said cam, are rocked into the neutral position through the pressure exerted by the bail 45 on the cam, whereupon the roller 46 escapes into the rest 43. The bail 45 is resiliently connected with plate 8 under the action of the return spring 45a, by means of two pins 49, 50 which are carried by this bail and preferably adjustable.

The operation of the device such as described above is as follows. The push rod 31, which is shown in the at rest position in Figure 1, is actuated in the direction of its axis through a pressure on the actuating button 32. The switching member which is connected to the push rod at flange 33 is moved towards the left in the example shown, so that the cam-shaped part of the said switching member raises the pitman 21 by means of the running path 26. The bail 17 is raised and with it also the pins 15, 16 which are connected with it, whereby the disc-shaped body 11 is also raised and thus coupled with the disc 8. Small pins 10a see Fig. 3, provided on the upper face of the disc-shaped body 11 enter corresponding bores 10 in the disc 8. Through this coupling of members 11 and 8 the axis 5, 5' of the card is fixed against azimuthal rotation, since the crown wheel 14 carried by flange 13 which is fast with the part 11 engages the pinion 36 which is secured against rotation by the worm wheel and gear 34 and 35 respectively. A rotary movement by means of the hand actuating member is not possible at this time, since this member is disengaged from the worm gear 34, 35 during the first part of the switching on operation during which pitman 21 slides along cam 26.

In the further course of the switching on operation, both coupling members 11 and 8 are raised in common and with them the pins 49, 50 during the second switching step as the pitman 21 continues its movement up the cam-shaped part 26. By means of the said pins the fixing device for the setting up axis 3—3' is now actuated by means of bail 45 in the manner which has been described above. Upon completion of the entire switching operation the pitman 21 has reached the final position shown in Figure 2 by lifting up part 28a of element 28.

By means of the novel switching operation, the fixing of the axis 5, 5' of the card and the fixing of the setting up axis 3, 3' are obtained in two successive switching steps through a single switching movement. The relative velocity of both switching operations may be varied in the desired manner through the form of the cam-shaped part 26 of the switching member, which form may be designed as above mentioned.

As soon as the push rod has completed the switching on operation, the disc 41, which is mounted coaxially with the said rod as seen in Fig. 1, engages the pins 39 mounted on the flange 38 of the worm 34, whereby the push rod is now coupled with the worm wheel 34 and gear 35. In order surely to maintain this coupling, a suitable locking device such as shown in Fig. 2 can be provided for the push rod 31. This comprises interlocking groove and resiliently urged ball elements 31a and 31b. In this coupling position, the worm wheel 34 and gear 35 and through them the setting gear 36, 14 can be actuated, through a rotation of the actuating button 32 and disc 41 in order to permit the azimuthal setting of the axis 5, 5' of the card.

During the switching on operation, the pitman 21 has passed from contact with the portion 23 of the switch 22 to contact the portion 24 by raising member 28, whereupon the member 28 again engages portion 26 under the action of the return spring 29 in the above described manner. During the switching out operation, during which the push rod 31 is now moved towards the right, the pitman 21 moves away from the surface 24 to the upper side of the member 28 until it reaches the recess 30 provided in this member see Fig. 6. As soon as the pitman 21 enters the recess 30 it is moved under the snap action of the return spring 20 of the lever 17 through the recess 30 back into contact with portion 23. Thus, the fixing device for the axis 5, 5' of the card and the fixing device for the setting up axis 3, 3' are simultaneously released. The purpose of the cut out member 28 including its recess 30 is therefore to short-circuit the running path 26 so that the release movement can be effected instantaneously.

Instead of a purely longitudinally slidable switching member, the switching member 22 may be replaced by a rotatably mounted switching member parallel to and cooperating with the pitman 21. An example of this arrangement is shown in Figure 8. The switching member 51 shown in this figure is rotatably mounted about an axis at 52 and it is rocked about the axis 52 through the push rod 31 by means of a pin 54 carried by this rod and movable in a guiding slot 53 of the switching member 51. For the at rest position, a rest 55 is provided into which the pitman 21 escapes in the switched out position, while the bearing surface 56 serves for the operative position. In the example shown, the switching on operation is effected through a movement of the push rod towards the right, the pitman 21 being moved from the at rest position at 55 on the running path between both surfaces 55 and 56 to the operative position at 56. The switching out operation is effected through a movement of the push rod 31 towards the left, the pitman 21 being moved on the short-circuit cut out element 57 generally similar to member 28 and reaching the at rest position again in a rapid variation of position through the opening 58 in the said element. The short-circuit element 57 is rotatably mounted on the switching member 51 at 59 and positively urged against the running path by the spring 60. Thus the conditions during the switching on and the switching out operation are fundamentally the same as with the above described longitudinally slidable switching member 22. It is obvious that through a mere reversal of element 51, as clearly disclosed in Figure 8a and wherein-like numerals designate like parts in Figure 8, the push rod 31, can be operated in the same direction as the above described example in which a movement of the push rod towards the left causes the switching on operation, while a movement of the push rod towards the right causes the switching out operation.

It is also possible to insert between the pitman and the switching member a guided lever member actuated by the push rod and comprising a guiding pin positively connected with the switching member. In the example of Figure 9, the switching member 61 replacing member 22 of Figs. 1–3 forms a part of the casing 7 but, of course, it could be formed also as an independent part and made fast with the casing. The at rest position is at 62 and the operative position is at 63 and between both is the running path for the guided pin 70, which is mounted in a lever 68 pivotaly connected to the push rod at 69. The short-circuit element 65 with the recess 66 is pivotally and through the spring 67 positively connected to the switching member. By means of the push rod the guiding pin 70 is moved on the running path 64 during the switching on operation. The movement of the guiding pin is transmitted through the lever member 68 to the pitman 21 which again moves upwardly. During the switching out operation, the pin 70 moves over the upper side of the short-circuit element 65 and returns again to the at rest position at 62 through the recess in an instantaneous variation of its position.

Figure 10 shows an example of execution in which the switching member 22 is replaced by the short-circuit element itself. The element 71 is rotatably mounted on the pin 72 which is fast with the casing and comprises also a spring 73 which causes the positive connection. The element 71 contains the running path 74 for the pin 70, which is connected with the pitman 21 through the lever member 68 in the same manner as in the example of Figure 9. Through the elimination of a particular switching member, the pin 70 must be by-passed so that a double movement of the push rod is necessary for the switching on operation. The pin 70 is moved towards the left from the at rest position beneath element 74 by raising element 74 and then by a movement of the push rod towards the right over the running path 74 the pitman is moved to the operative position which is shown in the drawing.

Another form of execution of the switching device formed of the switching member and the push rod is shown in Figures 11 and 12. To the switching member 22 is adjoined a locking device comprising a locking pawl 75 and a recess 76 in the switching member for receiving the said pawl. This locking device holds the switching member in its neutral position. The push rod 31 is rotatably mounted in the flange 33 of switching member and longitudinally slidable therein. A spring 77 is inserted between this flange 33 and a spring plate 31c secured to the axis of the push rod 31. When the push rod is moved towards the left during the switching on operation the spring 77 which acts as a force storing device is compressed. On the free end of the push rod is a tapered element 31a which engages the side of the locking pawl 75 when the end position of the push rod has been reached and releases the locking device 75, 76. At the same time or nearly at the same time, a spring locking nose 78 engages behind a collar 31b provided on the tapered element and holds the push rod in its end position. The force storing device 77 is then discharged against the switching member 22 which has been unlocked and moves the latter towards the left to the switching on position. Thus, the switching on operation is effected automatically under the action of the force storing device.

During the movement of the switching member towards the left, the locking pawl 75' is brought through a locking nose 79 into a second locking position through which the switching member is held in the switching on position. At the same time, a force storing device 81 adjoined to the switching member and also formed of a spring is loaded. In the operative position, the switching member is held fast, as above mentioned, through the locking device formed of the locking pawl 75 and the locking nose 79 which is provided with a bevelled portion 80. Now, if the switching out movement is initiated, the push rod 31, which has already been unlocked from the locking nose 78 during the movement of the switching member to the left, is moved to the right while carrying with it the switching member 22 connected to the flange 33 and disengaging the locking pawl 75 at 79, 80 through the pull to the right, since the pawl 75 slides over the nose 79 on the bevelled portion 80 under the action of the pull to the right. Now, as soon as the parts are unlocked at 75, 79 the force storing device 81 is discharged against the switching member and returns the latter to the at rest position.

Thus, in the above described switching device of Figures 11 and 12, it is sufficient that the parts are unlocked in both points 75, 76 and 75, 79 at the desired moment through the actuation of the push rod, whereupon the actuation of the switching member is automatically effected at the desired moment through the corresponding force storing device. The arrangement for the actuation of the setting gear for the azimuthal setting of the axis 5, 5' of the card can be the same as above described.

Figure 13 shows a security device which permits of the actuation of the push rod only after the said device has been unlocked. In the push rod 31 or in the switching member 22 respectively is provided a slide 82 which is slidable, for instance, under the action of a compression spring 83 and which engages a locking nose 84 fast with the casing. For the actuation of this slide, there is provided an actuating rod 85 which is guided in the push rod and held in the "out" position under the action of a return spring 85. Through a pressure on the button 87, the rod 86 slides on the compression surface 88 while moving the slide 82 downwardly against the action of the spring 83, so that the parts are unlocked at 84 and the push rod 31 can be actuated now. Thus it is necessary, in this case, that a pressure be exerted on both the actuating knob 32 and at the same time on the button 87 whereby the security device for the actuation of the push rod is unlocked.

Also another possibility for the construction of the switching device will be mentioned, as shown in Figs. 14 and 15. Instead of the longitudinally slidable arrangement, a movement of the switching member on a circular path which is concentric to the axis 5, 5' of the card is also possible. In this case, the switching cam is mounted on a circular ring or on a sector of such a ring such as 22a, which is actuated through the push rod in the above described manner. The switching member can be designed as shown in Fig. 15 so that a duplication of the switching cam and of the short-circuit element (not shown), which are mounted both on the same circular ring and set 180° apart so as to be aligned with the pins 15, 16, is provided. In this case both arms of the forked lever can be provided each with a pitman, as shown at 21a, both pitmans being in operative relation with the corresponding switching member. The actuation of the switching device is effected through the actuation of the circular ring by means of the push rod, actuating the pin 88 movable in slotted element 89 connected to ring 22a. In the case of a duplication of the switching member, as shown, a transmission of the raising movement of the pin 15 to the pin 16 by means of the forked lever 17 as with the above described longitudinally slidable switching member is not necessary. Here the only function of the forked lever 17 is to guide both pins 15, 16 or the pitmans adjoined to these pins and to effect the return to the at rest position under the action of the spring 20, see Fig. 5. Consequently, the lever 17 could be eliminated in this case and replaced by a straight-line guide in a guiding slot, a particular return spring being adjoined to each of both pins or pitmans.

The push rod can be actuated for instance by means of a releasing magnet which can be eventually remotely controlled. A particular drive, eventually with a remote control, can be provided, likewise, for the setting gear for the azimuthal setting of the axis of the card.

A series of other modifications, for instance in the coupling of the push rod with the worm gear, or the use of conical gears instead of the worm gear and the like, are also possible without departing from the principle of the invention.

Although this invention has been described in connection with certain specific embodiments, the principles involved are susceptible of numerous other applications that will readily occur to persons skilled in the art. The invention is therefore to be limited only as indicated by the scope of the appended claims.

What I claim is:

1. In a device of the character described, a casing, a gyro mounted therein for three degrees of freedom including freedom about horizontal and vertical axes, means for sequentially fixing said gyro against movement about said vertical axis and thereafter about said horizontal axis, said means comprising a cam, means for reciprocating said cam, means cooperating with said cam upon motion in one direction thereof to first fix said gyro against movement about said vertical axis and next fix said gyro against movement about said horizontal axis and means for by-passing said cam upon motion in the opposite direction whereby both of said fixing means are simultaneously released.

2. In a device of the character described, a casing, a vertical ring rotatably mounted in said casing about a vertical axis, a gyro mounted in said ring for oscillation about a horizontal axis, means for fixing said gyro against movement about said vertical axis and thereafter against movement about said horizontal axis, said means comprising a cam mounted for oscillating movement, a follower for said cam, a hinged element covering said cam and abutting the same at the free end thereof, said follower cooperating with said cam upon oscillation in one direction and with said hinged element to by-pass said cam upon oscillation in the opposite direction and means cooperating with said follower for actuating said fixing means.

3. In a gyroscopic indicator of direction, a casing, a gyroscope in said casing comprising a gyro rotor, a horizontal gimbal ring mounting said rotor for spinning about a normally horizontal axis, a vertical gimbal ring in which said first gimbal is mounted for oscillation about a horizontal axis perpendicular to the spin axis of said rotor, said vertical ring being mounted in said casing for angular movement about a vertical axis, means mounted on said vertical ring for rotatable movement therewith and axial displacement with respect thereto, means for engaging said first-named means to fix the gyro against movement about said vertical axis and thereafter to axially displace said first-named means, said engaging means including a bodily slidable cam, means for moving said cam transversely of said vertical axis whereby said engaging means fix said first-named means against rotation and thereafter axially displace said first-named means, and means associated with the horizontal axis of said gyro actuated during axial displacement of said first-named means for fixing said gyro against movement about said horizontal axis.

4. In a device of the character described, a casing, a gyro mounted therein for three degrees of freedom including freedom about horizontal and vertical axes, means for fixing said gyro against movement about said vertical axis and thereafter about said horizontal axis comprising means mounted for rotatable movement with said gyro about said vertical axis and for axial movement with respect to said gyro, an annular member provided with means for engaging said last-named means against rotation fixing said gyro against movement about said vertical axis and thereafter axially moving said last-named means to fix said gyro against rotation about said horizontal axis, and means for actuating said annular member comprising a cam slidably mounted in said casing, a follower for said cam, means interposed between said follower and said annular member whereby the motion of said follower is transmitted to said annular member, a pivoted element having a recessed portion overlapping said cam and abutting the same at the free end thereof, means for moving said cam in one direction whereby said follower moves along the surface of said cam and tilts said hinged element, said follower cooperating with said hinged element to by-pass said cam upon actuation of said moving means in the opposite direction, said follower passing through the recessed portion of said element at the limit of movement of said moving means.

5. In a device of the character described having a casing, a gyro mounted in said casing for three degrees of freedom including freedom about vertical and horizontal axes, means mounted within said casing for rotatable movement with and axial displacement with respect to said gyro about said vertical axis, means associated with said horizontal axis, means mounted in said casing being movable in the direction of said vertical axis for engaging said first-named means fixing said gyro against movement about said vertical axis and thereafter axially moving said first-named means to engage said means associated with the horizontal axis to fix said gyro against movement about said horizontal axis, said engaging means including a gear movable therewith, and means including manually operable means for engaging said gear to adjust said gyro about the vertical axis to any desired position when said gyro is fixed against movement about said vertical and horizontal axes and said gear has been moved vertically with said engaging means.

6. In a device of the character described, a housing, a vertical ring rotatably mounted about a vertical axis in said housing, a gyro rotor mounted in said ring for oscillation about a horizontal axis, a plate member secured to said ring for rotation therewith being adapted for vertical displacement with respect thereto, an axially displaceable annular member provided with means for engaging said plate member, means pivotally connected with said ring for engaging said horizontal axis, and means including a manually operable member for initially moving said annular member causing said engaging means to lock said plate member to said annular member fixing said vertical ring against movement about said vertical axis and thereafter vertically displacing said plate member to actuate said pivoted means to fix said gyro rotor against oscillation about said horizontal axis.

7. In a device of the character described, a housing, a vertical ring mounted for rotation about a vertical axis in said housing, a gyro rotor mounted in said ring for oscillation about a horizontal axis, an annular plate secured to said vertical ring for rotation therewith and mounted for vertical displacement with respect thereto, and disc means in said housing mounted coaxially with said vertical axis and adapted for axial displacement with respect to said vertical axis, said disc means being provided with clutching members for locking said annular plate to said disc means when the disc means are axially displaceable thereby fixing said vertical ring against rotation about said vertical axis.

HERMANN BRANDT.